United States Patent

Nakazawa et al.

Patent Number: 5,206,925
Date of Patent: Apr. 27, 1993

[54] RARE EARTH ELEMENT-DOPED OPTICAL WAVEGUIDE AND PROCESS FOR PRODUCING THE SAME

[75] Inventors: Masataka Nakazawa; Yasuo Kimura, both of Mito; Katsuyuki Imoto, Sayama; Seiichi Kashimura, Hitachi; Toshikazu Kamoshida, Kuji; Fujio Kikuchi, Katsuta, all of Japan

[73] Assignees: Hitachi Cable Limited; Nippon Telegraph and Telephone Corporation, both of Tokyo, Japan

[21] Appl. No.: 692,336

[22] Filed: Apr. 26, 1991

[30] Foreign Application Priority Data

Jun. 29, 1990 [JP] Japan .................................. 2-173156

[51] Int. Cl.⁵ .......................... G02B 6/10; H01L 21/70
[52] U.S. Cl. ..................................... 385/142; 385/130; 385/131; 385/132; 385/14; 437/51
[58] Field of Search ............... 350/96.12, 96.29, 96.30, 350/96.31, 96.32, 96.33, 96.34; 385/123–132, 144, 142, 144, 14; 437/51, 15

[56] References Cited

U.S. PATENT DOCUMENTS

| | | | |
|---|---|---|---|
| 4,284,663 | 8/1981 | Carruthers et al. | 385/123 X |
| 4,637,025 | 1/1987 | Snitzer et al. | 385/33 X |
| 4,679,892 | 7/1987 | Haisma et al. | 385/130 X |
| 4,826,288 | 5/1989 | Mansfield et al. | 385/123 X |
| 4,901,321 | 2/1990 | Blondeau et al. | 372/7 |
| 4,936,650 | 6/1990 | Ainslie et al. | 385/141 X |
| 4,946,241 | 8/1990 | Krumme et al. | 385/130 X |
| 5,039,190 | 8/1991 | Blonder et al. | 385/142 X |
| 5,107,538 | 4/1992 | Benton et al. | 385/130 |

FOREIGN PATENT DOCUMENTS

| | | |
|---|---|---|
| 0281800 | 9/1988 | European Pat. Off. |
| 0304709 | 3/1989 | European Pat. Off. |
| 1443750 | 7/1976 | United Kingdom . |
| 2113006 | 7/1983 | United Kingdom . |
| 2180667 | 4/1987 | United Kingdom . |
| 2181861 | 4/1987 | United Kingdom . |
| 2181862 | 4/1987 | United Kingdom . |
| 2223351 | 4/1990 | United Kingdom . |

Primary Examiner—Brian Healy
Attorney, Agent, or Firm—Dykema Gossett

[57] ABSTRACT

A core waveguide having a substantially rectangular cross section, with the width thereof greater than the thickness thereof, is provided in a cladding formed on a substrate, and a rare earth element-doped layer is provided in the core waveguide along the waveguiding direction of the waveguide. With the width of the core waveguide set greater than the thickness of the core waveguide, good optical confinement in the width direction of the waveguide is obtained, which enables light to be absorbed by the rare earth element-doped layer efficiently and concentratedly. It is thereby possible to achieve a marked improvement in the excitation efficiency of excitation power. Thus, an enhanced excitation efficiency is achieved with less addition of a rare earth element, and a high-gain optical amplification waveguide free of concentration extinction is provided.

12 Claims, 12 Drawing Sheets

DRY ETCHING &
REMOVAL OF PHOTORESIST

FORMATION OF COVERING
CORE LAYER

FORMATION OF METAL FILM

PHOTOLITHOGRAPHY

DRY ETCHING OF METAL FILM

DRY ETCHING OF COVERING
CORE LAYER

REMOVAL OF PHOTORESIST &
METAL FILM

FORMATION OF CLAD LALYER

FIG. 10(a) FORMATION OF GLASS FILM
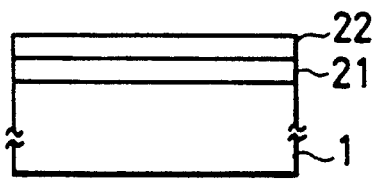
FIG. 10(b) FORMATION OF METAL FILM
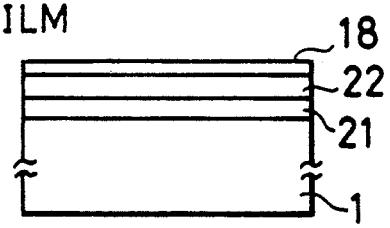
FIG. 10(c) PHOTOLITHOGRAPHY
FIG. 10(d) DRY ETCHING OF METAL FILM
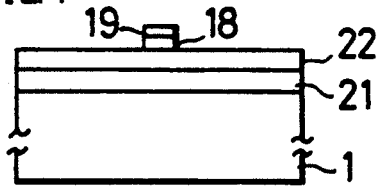
FIG. 10(e) DRY ETCHING OF CORE LAYER
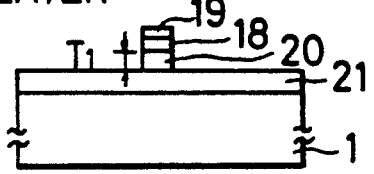
FIG. 10(f) REMOVAL OF PHOTORESIST & METAL FILM
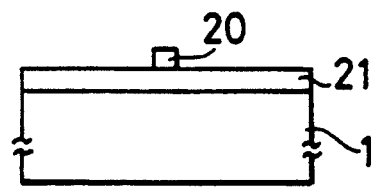
FIG. 10(g) FORMATION OF GLASS FILM
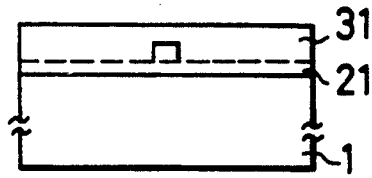
FIG. 10(h) PHOTOLITHOGRAPHY, DRY ETCHING
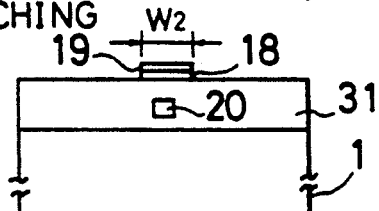
FIG. 10(i) DRY ETCHING OF CORE LAYER AND REMOVAL OF PHOTORESIST & METAL FILM
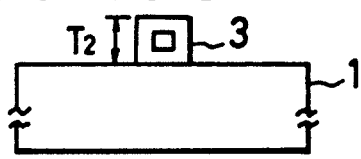
FIG. 10(j) FORMATION OF CLAD LAYER
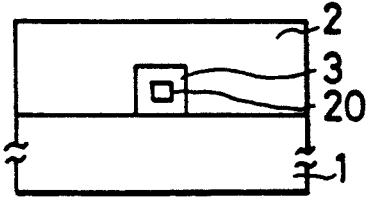

DRY ETCHING & REMOVAL OF PHOTORESIST

FORMATION OF GLASS FILM

FORMATION OF METAL FILM

PHOTOLITHOGRAPHY

DRY ETCHING OF METAL FILM

DRY ETCHING

REMOVAL OF PHOTORESIST & METAL FILM

FORMATION OF CLAD LAYER

RARE EARTH ELEMENT-DOPED OPTICAL WAVEGUIDE AND PROCESS FOR PRODUCING THE SAME

BACKGROUND OF THE INVENTION

1. Technical Field

This invention relates to an optical waveguide for optical amplification, particularly a rare earth element-doped optical waveguide having a core waveguide doped with a rare earth element, and to a process for producing the same.

2. Background Art

Optical fiber amplifiers and fiber lasers in which the core layer of an optical fiber is doped with a rare earth element, such as Er (for amplification at wavelengths around 1.55 μm) and Nd (for amplification at wavelengths around 1.3 μm), are vigorously studied at present for use thereof as optical amplifiers. The optical fiber amplifiers and fiber lasers have the advantages that (1) the core diameter thereof as small as 10 μm ensures an enhanced excitation power density, leading to a higher excitation efficiency, (2) they permit a longer interaction length, (3) they show a very low loss when a silica optical fiber is used therein, and so on.

However, when the optical fiber amplifiers and fiber lasers are mounted together with semiconductor lasers, photodetection devices, optical modulation circuits, optical branching/coupling circuits, optical switching circuits, optical wave mixing/separating circuits or the like to construct a system, there arises the problem that, because of the discrete component parts, it is difficult to obtain a system with a smaller size and a lower loss. In addition, the discrete component parts should be arranged with adjustments of the respective optical axes of the component parts. The adjustments require a very long time, leading to a higher cost, and bring about reliability problems.

Recently, therefore, attention has come to be paid to rare earth element-doped silica optical waveguides (the rare earth element being Er or Nd in most cases) for their potential use as future-type optical amplifiers, in view of the probability that the doped silica optical waveguides can be made smaller and integrated, as contrasted to the optical fiber type amplifiers.

There has been known a process for producing a silica optical waveguide as shown in FIG. 12 (K. Imoto, et al., "Guided-wave multi/demultiplexer with high stopband rejection", Applied Optics Vol. 26, No. 19, October 1987, pp. 4214-4219). The process comprises a series of the following steps (1) to (8):

(1) providing a core glass film 25 ($SiO_2$-$TiO_2$ glass) on a substrate 1 ($SiO_2$ glass) [FIG. 12(a)], with the refractive-index difference between the glass film 25 and the substrate 1 being about 0.25% and with the thickness T of the glass film 25 being about 8 μm;

(2) heat-treating the thus obtained assembly at a high temperature of about 1200° C. to make the film 25 denser [FIG. 12(b)];

(3) providing a $WSi_x$ film 26 which, to be used for etching the core glass film 25, is about 1 μm thick [FIG. 12(c)];

(4) applying a photoresist to the $WSi_x$ film 26 and patterning the thus formed photoresist film 27 by photolithography [FIG. 12(d)];

(5) patterning the $WSi_x$ film 26 by dry etching, with the patterned photoresist film 27 as a mask [FIG. 12(e)];

(6) patterning the core glass film 25 by dry etching, with the patterned photoresist film 27 and the patterned $WSi_x$ film 26 as a mask [FIG. 12(f)];

(7) removing the photoresist film 27 and the $WSi_x$ film 26 [FIG. 12(g)]; and (8) providing a clad layer 28 ($SiO_2$-$P_2O_5$-$B_2O_3$ glass) over the substrate 1 so as to cover the patterned core glass film 25, thereby producing a silica optical waveguide having a substantially rectangular shaped core waveguide 3 in the cladding.

It is difficult for an optical waveguide with a planar structure to be formed into an elongate shape, as in the case of an optical fiber. To obtaining a better excitation efficiency, therefore, an increased amount of a rare earth element should be added to the core of the optical waveguide. It has been found, however, that doping with a large amount of a rare earth element causes concentration extinction, thereby making it impossible to obtain the desired lasing or amplifying function.

The above-mentioned conventional process for producing a silica optical waveguide can be used, with no special problems, where the core glass film 25 is not doped with a rare earth element such as Er and Nd. It has been found, however, that where the core glass film 25 is doped with a rare earth element the conventional process results in roughening of side surfaces of the core waveguide in the step of patterning the core glass film 25 by dry etching, shown in FIG. 12(f). The roughened side surfaces of the core waveguide cause scattering of the propagating light, leading to an energy loss and a lowered optical amplification efficiency. FIG. 13(a) shows an SEM photograph of a rare earth element-doped core waveguide formed by the conventional process, and FIG. 13(b) shows an SEM photograph of a core waveguide not doped with a rare earth element. The photographs show how the side surfaces of the core waveguide doped with a rare earth element is roughened, and also show the deposition of a product, which is considered to be a compound of the rare earth element, on the surfaces of the waveguide.

This is because the rare earth element added to the core glass film 25 is left unetched after the step of patterning the core glass film 25 by dry etching. For instance, when an Er-doped core glass film is dry etched by use of $CHF_3$ as a reactive gas, Si and Ti are converted into reaction products of high vapor pressures through the reactions:

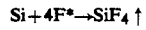

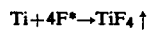

and are thereby etched away. On the other hand, Er is converted into a reaction product of a low vapor pressure through the reaction process:

and the reaction product $ErF_3$ is left unetched. The symbol "*" is used here to indicate that the same discussion applies to the cases where a chlorine-containing etching gas other than $CHF_3$ is used.

SUMMARY OF THE INVENTION

It is accordingly an object of this invention to provide a rare earth element-doped optical waveguide capable of displaying an optical amplification function with high efficiency and a process for producing the same.

According to a first aspect of this invention, there is provided a rare earth element-doped optical waveguide in which a core waveguide substantially rectangular in cross section with the width thereof greater than the thickness thereof is provided in a cladding formed on a substrate, and a rare earth element-doped layer is provided in the core waveguide along a waveguiding direction. With the width of the core waveguide set greater than the thickness of the core waveguide, good optical confinement in the width direction of the waveguide is ensured, which enables the light to be absorbed by the rare earth element-doped layer efficiently and concentratedly. Consequently, it is possible to achieve a marked improvement in the excitation efficiency of excitation power. It is thus possible to achieve a higher excitation efficiency through doping with a smaller amount of a rear earth element, and to realize a high-gain optical amplification waveguide free of concentration extinction.

According to a second aspect of this invention, there is provided a rare earth element-doped optical waveguide in which the above-mentioned rare earth element-doped layer is formed at a substantially central portion of the core waveguide, with respect to the thickness direction of the core waveguide, and has a uniform impurity doping concentration with respect to the width direction thereof. With the rare earth element-doped layer thus provided at the substantially central portion with respect to the thickness direction of the core waveguide, at which portion the power distribution of the excitation light reaches its maximum, it is possible to effectively enhance further the excitation efficiency. Thus, a higher excitation efficiency is achievable through doping with a small amount of a rare earth element, and it is possible to obtain an high-gain optical amplification waveguide free of concentration extinction.

According to a third aspect of this invention, there is provided a rare earth element-doped optical waveguide in which a plurality of the rare earth element-doped layers are provided in the core waveguide in the state of being spaced from each other along the thickness direction of the core waveguide. The arrangement of the plurality of rare earth element-doped layers in correspondence with the power distribution of excitation light in the core waveguide promises a further effective improvement of the excitation efficiency. It is thus possible to enhance the excitation efficiency with a small addition of a rare earth element, and to realize a high-gain optical amplification waveguide which does not cuase concentration extinction. Moreover, the arrangement of the plurality of rare earth element-doped layers enables an optical circuit with less dependency on polarization.

According to a fourth aspect of this invention, there is provided a rare earth element-doped optical waveguide in which at least one of the plurality of the rare earth element-doped layers provided spaced apart from each other along the thickness direction of the core waveguide has a thickness different from the thickness of each of the other rare earth element-doped layers. In providing a plurality of rare earth element-doped layers in accordance with the power distribution of excitation light in the core waveguide, the rare earth element-doped layer located at a portion where the power is more concentrated than at other portions is thus set thicker than the other doped layers, whereby a further effective enhancement of the excitation efficiency is enabled. Thus, a higher excitation efficiency is achieved through doping with a small amount of a rare earth element, and it is possible to realize a high-gain optical amplification waveguide free of concentration extinction. In addition, the arrangement of the plurality of rare earth element-doped layers offers an optical circuit which is less dependent on polarization.

According to a fifth aspect of this invention, there is provided a rare earth element-doped optical waveguide in which the volume occupied by the region of the rare earth element-doped layer(s) is not more than 30% based on the entire volume of the core waveguide. Where a plurality of rare earth element-doped layers are provided, concentration extinction will not occur if the volume occupied by the rare earth element-doped layers is not more than 30% based on the entire volume of the core waveguide. It is thus possible to realize a high-gain optical amplification waveguide.

According to a sixth aspect of this invention, there is provided a rare earth element-doped optical waveguide in which the refractive index of the rare earth element-doped layer is greater than the refractive index of the region of the core waveguide which is not doped with a rare earth element. With the refractive index of the rare earth element-doped layer set higher, light is confined in the rare earth element-doped layer and is absorbed by the rare earth element-doped layer efficiently and concentratedly. This enables a marked increase in the excitation efficiency of excitation power. Thus, a higher excitation efficiency is achieved through doping with a small amount of a rare earth element, and it is possible to realize a high-gain optical amplification waveguide free of concentration extinction.

According to a seventh aspect of this invention, there is provided a rare earth element-doped optical waveguide comprising a core waveguide substantially rectangular in cross section provided in a cladding formed on a substrate, in which the core waveguide comprises a first core waveguide doped with a rare earth element and substantially rectangular in cross section, and a second core waveguide provided so as to cover the first core waveguide and not doped with a rare earth element. The arrangement in which the first core waveguide doped with a rare earth element is covered by the second core waveguide not doped with a rare earth element enables prevention of the scattering of the propagating (transmitted) light at the surface of the first core waveguide. It is thus possible to reduce the energy loss arising from scattering of the propagating (transmitted) light, and to enhance optical amplification efficiency.

According to an eighth aspect of this invention, there is provided a rare earth element-doped optical waveguide in which the first core waveguide is doped with the rare earth element in a layer form along the waveguiding direction. The arrangement in which the first core waveguide doped with the rare earth element in a layer form is covered by the second core waveguide not doped with a rare earth element ensures that the propagating (transmitted) light is prevented from scattering at the surface of the rare earth element-doped portion of the first core waveguide. It is thus possible to reduce the energy loss arising from scattering of the propagating (transmitted) light, and to enhance the excitation efficiency through doping with a small amount of a rare earth element. Consequently, a high-gain optical amplification waveguide free of concentration extinction is achievable.

According to a ninth aspect of this invention, there is provided a rare earth element-doped optical waveguide in which the refractive index of the first core waveguide is equal to or greater than the refractive index of the second core waveguide. With the refractive index of the first core waveguide thus set equal to or greater than the refractive index of the second core waveguide, better optical confinement in the first core waveguide is ensured, and the light is absorbed by the rare earth element-doped layer efficiently and concentratedly. It is thus possible to enhance the transmission efficiency of the core waveguide, and to enhance markedly the excitation efficiency of excitation power.

According to a tenth aspect of this invention, there is provided a process for producing a rare earth element-doped optical waveguide comprising the steps of providing a first clad layer on a substrate, laminating alternately at least one core layer not doped with a rare earth element and at least one core layer doped with a rare earth element, on the first clad layer, carrying out photolithography, dry etching and the like to form a core waveguide having a rare earth element-doped layer and a substantially rectangular cross-sectional shape on the first clad layer, and providing a second clad layer so as to cover the entire surface of the core waveguide. Since the rare earth element-doped optical waveguide is formed on the substrate by the planar technique, a predetermined portion of the core waveguide constituting a light-transmitting portion of the glass waveguide is capable of being doped with the rare earth element concentratedly and uniformly with respect to the width direction. It is thus possible to enhance the excitation efficiency through "doping with a small amount of a rare earth element, and to realize a high-gain optical amplification waveguide which hardly exhibits any concentration extinction. Further, this process enables the rare earth element-doped optical waveguide to be formed together with other optical devices on the substrate in a collective manner; therefore, it is possible to produce a multifunctional system with high quality.

According to an eleventh aspect of this invention, there is provided a process for producing a rare earth element-doped optical waveguide comprising the steps of providing a first core waveguide doped with a rare earth element and substantially rectangular in cross section on a substrate having a low refractive index, providing a core layer not doped with a rare earth element over the substrate so as to bury completely the first core waveguide, carrying out photolithography, dry etching and the like to form on the substrate a core waveguide comprising the first core waveguide and a rare earth element-undoped second core waveguide covering the first core waveguide, and providing a clad layer so as to cover the entire surface of the core waveguide. Thus, in providing the core waveguide, the first core waveguide doped with the rare earth element is formed and then the rare earth element-undoped second core waveguide covering the first core waveguide is formed, whereby the surface of the core waveguide is formed to be smooth. This enables prevention of the scattering of the propagating (transmitted) light at the surface of the core waveguide, thereby making it possible to reduce the energy loss arising from the scattering of the propagating (transmitted) light and to enhance the optical amplification efficiency.

According to a twelfth aspect of this invention, there is provided a process for producing a rare earth element-doped optical waveguide in which a core layer formed of the same material as the second core waveguide is provided on the low-refractive-index substrate, and then the first core waveguide is provided on the thus formed core layer. This process is characterized by the formation of the core layer formed of the same material as the second core waveguide, on the substrate, followed by the formation of the second core waveguide so as to cover the first core waveguide, whereby the first core waveguide is formed at a central portion of the core waveguide. Thus, only the central portion of the core waveguide is doped with the rare earth element. It is thereby possible to reduce the energy loss arising from the scattering of the propagating (transmitted) light at the surface of the core waveguide, and to enhance markedly the amplification gain and amplification efficiency, as compared to those in the case where the core waveguide is doped in whole with the rare earth element.

BRIEF DESCRIPTION OF THE DRAWINGS

FIGS. 7(a)-(d) and 9(a)-(h), 10(a)-(j) and 11(a)-(h) are flow sheets illustrating another embodiment of the process according to this invention;

DESCRIPTION OF THE PREFERRED EMBODIMENTS

Some preferred embodiments of this invention will now be explained referring to the accompanying drawings.

Figure 1:
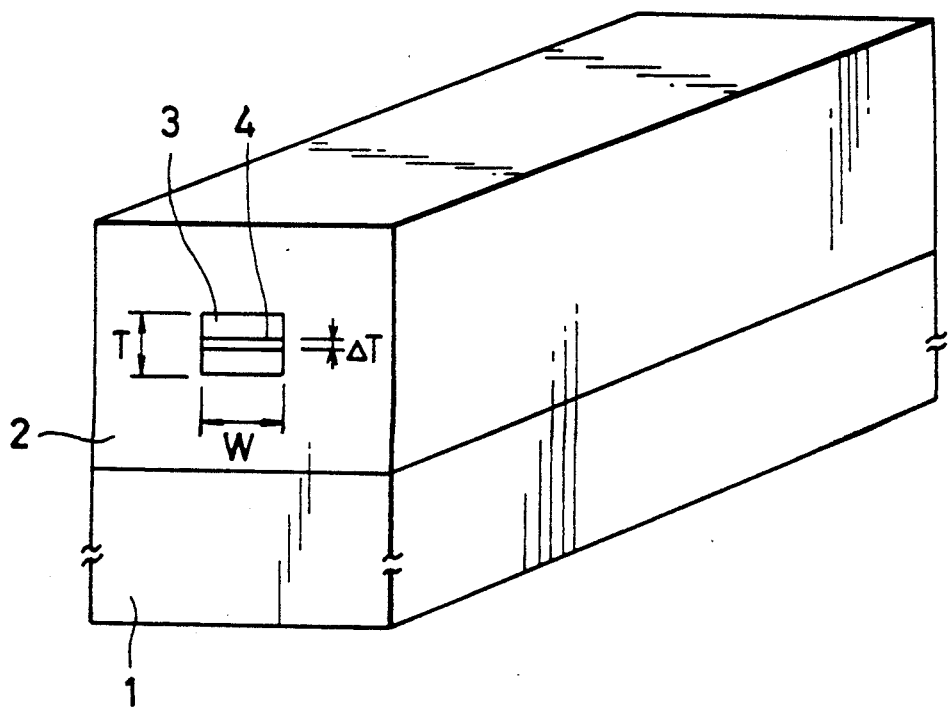
FIG. 1 is a perspective view showing one embodiment of a rare earth element-doped optical waveguide according to this invention.

Referring first to FIG. 1, there is shown a rare earth element-doped waveguide which comprises a substrate 1 (for instance, a substrate of a semiconductor such as Si and GaAs; a substrate of a glass such as $SiO_2$ and $SiO_2$ doped with a refractive index controlling dopant; a substrate of a ferroelectric material such as $LiNbO_3$ and $LiTaO_3$; or a substrate of a magnetic material such as YIG), a cladding 2 of a lower refractive index, $n_c$, formed on the substrate, and a core waveguide 3 of a higher refractive index, $n_w$ ($n_w > n_c$), buried in the cladding 2. The cladding 2 is formed by using $SiO_2$ or using $SiO_2$ containing at least one dopant, such as B, F, P, Ge, Ti, Al, Ta, Zn, K, Na, La and Ba. The core waveguide 3 is also formed by using a material similar to the material for the cladding 2. In a central region $\Delta T$ of the core waveguide 3 with respect to the direction of thickness T, a rare earth element-doped layer 4 is provided. The dopant for the rare earth element-doped layer 4 is a dopant containing at least one element selected from Er, Nd, Yb, Sm, Ce, Ho, Tm and the like. In the case of a single-mode optical waveguide, the refractive-index difference between the core waveguide 3 and the cladding 2 is selected in the range of 0.2 to 0.7%. The thickness T of the core waveguide 3 is selected in the range of from several micrometers to ten and a few micrometers, and the width W of the core waveguide 3 is selected in the range of from several micrometers to ten and a few micrometers. For stronger confinement of light in the width direction of the core waveguide 3 and for efficient and concentrated absorption of excitation light into the region of the rare earth element-doped layer 4, the core waveguide 3 is so designed that $W > T$. For instance, where the optical waveguide is to be used as a single-mode optical waveguide at wavelength around 1.55 $\mu$m, the core waveguide 3 is so designed that $T = 7$ $\mu$m, $W = 11$ $\mu$m, the refractive-index difference between the core waveguide 3 and the cladding 2 is 0.25%, and $\Delta T = 1$ $\mu$m to 4 $\mu$m. When the region where the power distribution of excitation light reaches its maximum in the core waveguide 3, namely, a central portion with respect to the layer thickness direction of the core waveguide 3 is thus doped with a rare earth element, it is possible to obtain a high excitation efficiency through doping with a small amount of the rare earth element. That is to say, the arrangement in this embodiment permits the doping with a reduced amount of a rare earth element, as compared with the doping amount in the conventional doping where the core waveguide 3 is doped in whole with the rare earth element, and the arrangement enables a higher excitation efficiency. Consequently, it is possible to realize a high-gain optical amplification concentration extinction.

Figure 2A:
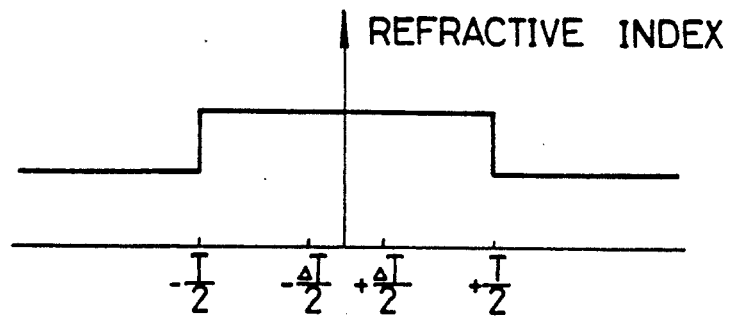
FIGS. 2(a)-(d) shows a set of diagrams representing one embodiment of the refractive-index distribution in the thickness direction of the optical waveguide of FIG. 1.
Figure 2B:
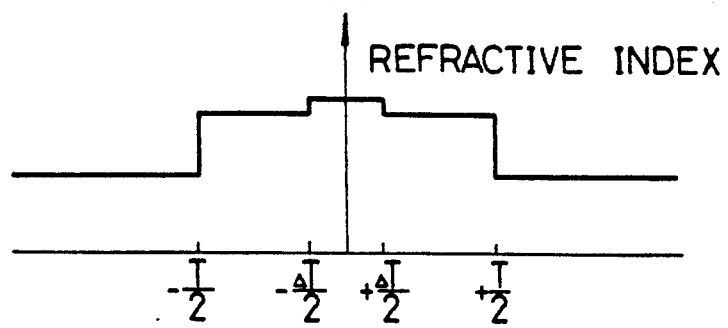
Figure 2C:
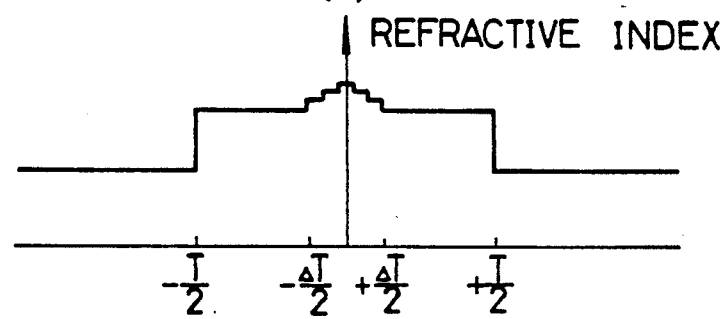
Figure 2D:
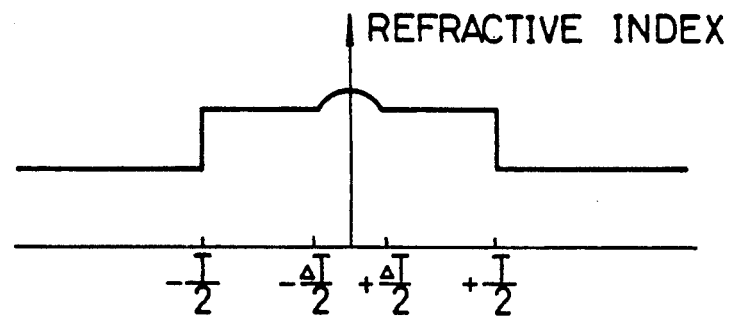

FIGS. 2(a) to (d) each show a refractive-index distribution in the thickness direction of the rare earth element-doped optical waveguide shown in FIG. 1. FIG. 2(a) shows the case where the refractive-index distribution in the thickness direction of the core waveguide 3 is flat, that is, where the refractive index of the rare earth element-doped layer 4 is equal to the refractive index in the rare earth element-undoped region of the core waveguide 3. FIGS. 2(b) to 2(d) show the cases where the refractive index of the rare earth element-doped layer 4 is slightly higher than the refractive index in the rare earth element-undoped region of the core waveguide 3. More specifically, FIG. 2(b) shows the case where the refractive-index distribution in the rare earth element-doped layer 4 is flat, FIG. 2(c) shows the case where the refractive index increases stepwise as a central portion is approached, and FIG. 2(d) shows the case where the refractive index increases continuously in a curved line form as the central portion is approached. With the refractive index of the rare earth element-doped layer 4 set greater than the refractive index in the surrounding core waveguide 3, as shown in FIGS. 2(b) to 2(d), the confinement of excitation light in the rare earth element-doped layer 4 is strengthened, and a higher excitation efficiency can be expected.

Figure 3:
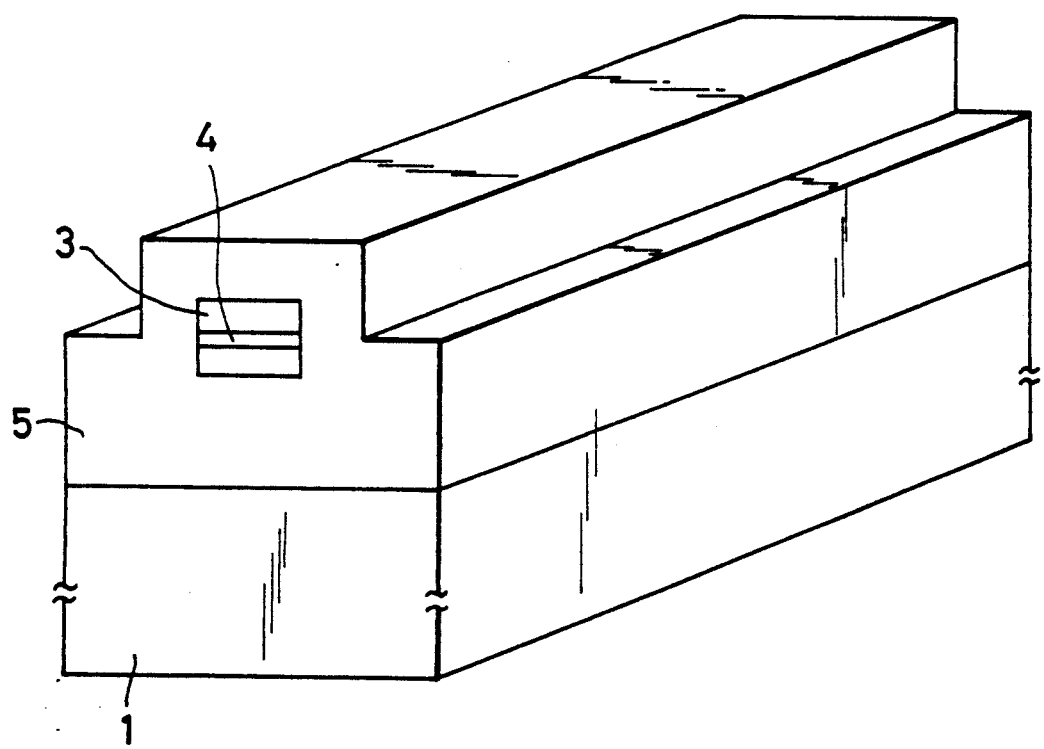
FIGS. 3, 5, 6 and 8 illustrate other embodiments of the rare earth element-doped optical waveguide of this invention.

In FIG. 3, the cladding 5 is provided in a projected shape so that the cladding 5 is thinner on the sides of side faces of the core waveguide 3 than on the other sides, in order to obviate application of a surplus stress (stress arising from differences in coefficient of thermal expansion) on the interior of the core waveguide 3.

The structure of the rare earth element-doped optical waveguide is not limited to the above embodiment. For instance, a so-called coupled waveguide structure may be used in which a plurality of core waveguides 3 is provided in the cladding. Other than the rectilinear waveguide, there may be used a curved waveguide, a waveguide having a 90° bent portion and the like. Furthermore, the waveguide may be combined with other optical devices (for example, interference filter, lens, prism, semiconductor laser, detection element). Moreover, the rare earth element-doped optical waveguide as mentioned above may be used to construct an optical circuit such as an optical directional coupler, a Y-junction waveguide, a ring resonator (cavity), an optical wave demultiplexer, an optical star coupler, an optical switch, an optical modulation circuit, etc.

FIGS. 4(a) to 4(d) show a set of schedule drawings illustrating one embodiment of a process for producing a rare earth element-doped optical waveguide according to this invention.

Figure 4A:
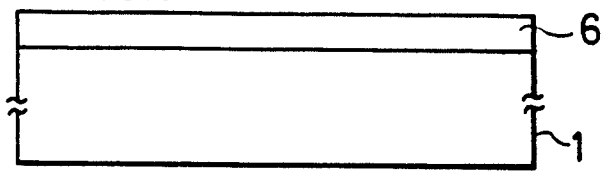
FIGS. 4(a)-(d) shows a set of schedule drawings illustrating one embodiment of the process according to this invention.
Figure 4B:
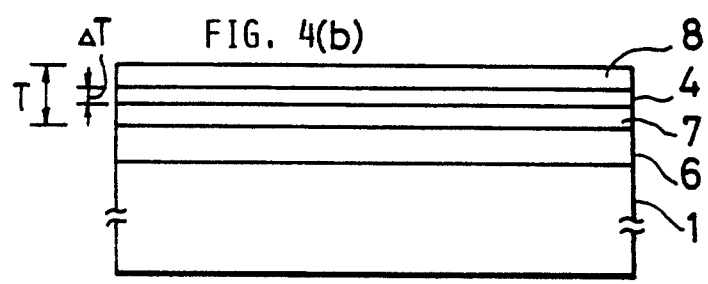
Figure 4C:
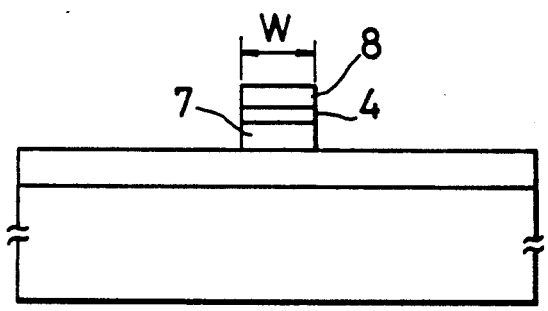
Figure 4D:
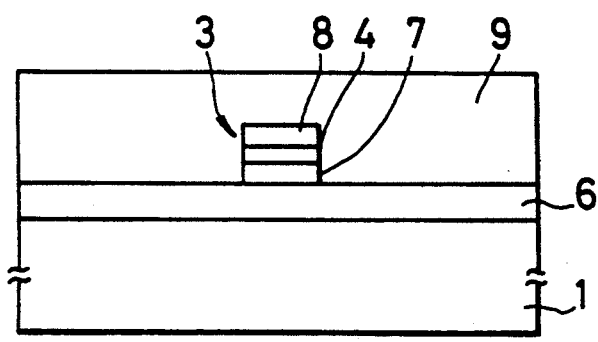

First, as shown in FIG. 4(a), a first clad layer 6 is provided on a substrate 1. The first clad layer 6 may be provided by any one of the CVD method, the flame deposition method, the electron beam source evaporation method, the sputtering method and the like. Next, as shown in FIG. 4(b), a first core glass layer 7 is provided on the first clad layer 6 in a thickness of $(T/2 - \Delta T/2)$. The first core glass layer 7 also may be provided by any one of the above-mentioned methods. Thereafter, a rare earth element-doped layer 4 is formed on the first core glass layer 7 and, further, a second core glass layer 8 of substantially the same material as the first core lass layer 7 is provided on the rare earth element-doped layer 4. In this process, the first core glass layer 7, the rare earth element-doped layer 4, and the second core glass layer 8 may be provided by a continuous process or by a discontinuous process. Then, as shown in FIG. 4(c), photolithography and dry etching process are carried out to shape the first and second core glass layers 7, 8 and the rare earth element-doped layer 4 into a rectangular form, thereby providing on the first clad layer 6 a core waveguide 3 having a rectangular cross-sectional shape with the width W greater than the thickness T. Finally, the core waveguide 3 is covered by a second clad layer 9 having substantially the same refractive index as that of the first clad layer 6.

According to this process, the rare earth element-doped optical waveguide is provided on the substrate 1 by the planar technique and, accordingly, a part (rare earth element-doped layer 4) of the core waveguide 3 constituting the light-transmitting portion of the waveguide is capable of being doped with the rare earth element concentratedly and uniformly with respect to the width direction. By this process, further, it is possible to form the rare earth element-doped optical waveguide together with other optical devices in a collective manner on the substrate, and to produce a multifunctional system with high quality.

Figure 5:
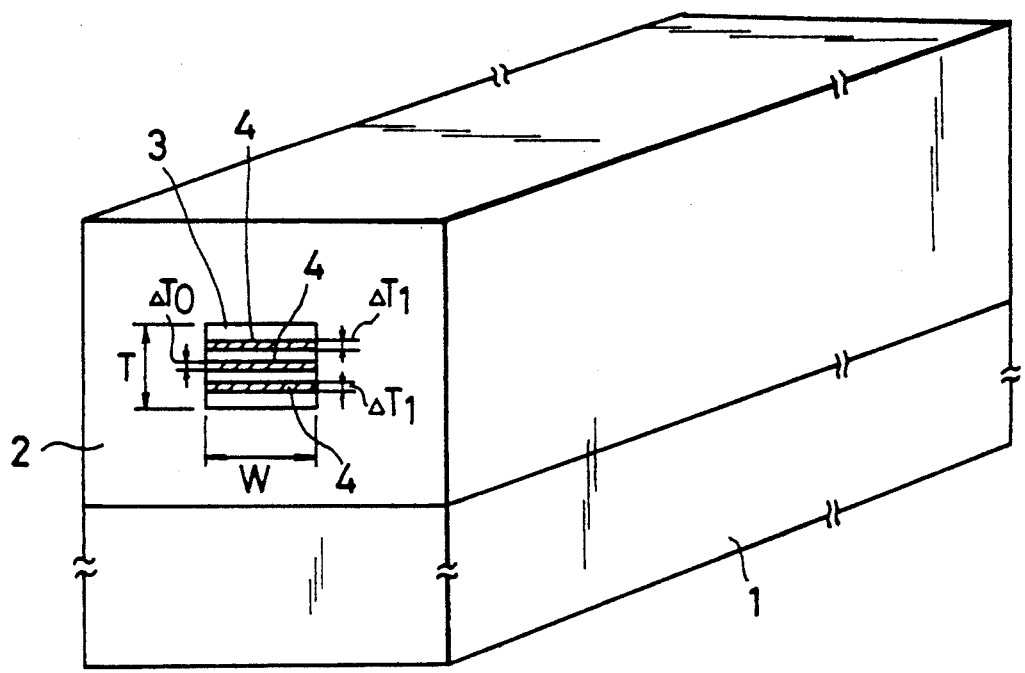

Referring to FIG. 5, a plurality of rare earth element-doped layers are provided in a core waveguide 3. Viewed in the direction of thickness T of the core waveguide 3, a central region of thickness $\Delta T_0$, a lower region of thickness $\Delta T_1$, and an upper region of thickness $\Delta T_1$ are doped with the rare earth element, to form three rare earth element-doped layers 4 which are spaced apart from each other along the layer thickness direction of the core waveguide 3. As the rare earth element, an agent containing at least one of Er, Nd, Yb, Sm, Ce, Ho, Tm and the like is used. In the case of a single-mode optical waveguide, the refractive-index difference between the core waveguide 3 and the cladding 2 is selected in the range of from 0.2 to 0.8%, whereas the thickness T of the core waveguide 3 is selected in the range of from several micrometers to ten and a few micrometers, and the width W of the core waveguide 3 is also selected in the range of from several micrometers to ten and a few micrometers. For stronger confinement of light in the width direction of the core waveguide 3 and for efficient and concentrated absorption of excitation light into the rare earth element-doped regions 10, 11 and 12 of the core waveguide 3, the core waveguide 3 is so designed that W>T. For instance, where the optical waveguide is to be used as a single-mode optical waveguide at wavelengths around 1.5 μm, the core waveguide 3 is so designed that T=8 μm, W=12 μm, the refractive-index difference between the core waveguide 3 and the cladding 2 is 0.259%, $\Delta T_0 = 2$ μm, $\Delta T_1 = 1$ μm, and the thickness of the region not doped with the rare earth element (Er) is 1 μm. In this embodiment, an $SiO_2$-$GeO_2$-$B_2O_3$ glass was used as the material for the core waveguide 3, whereas an $SiO_2$-$P_2O_5$-$B_2O_3$ glass was used as the material for the cladding 2, and an $SiO_2$ glass was used for the substrate 1. When the core waveguide 3 is doped with the rare earth element in a multilayer pattern according to the power distribution of excitation light in the core waveguide 3, it is possible to reduce the doping amount of the rare earth element, as compared with the amount in the case where the core waveguide 3 is doped in whole and uniformly with the rare earth element, and also to enhance the excitation efficiency of excitation light. That is to say, it is possible to realize a high-gain optical amplification waveguide free of concentration extinction.

Figure 6:
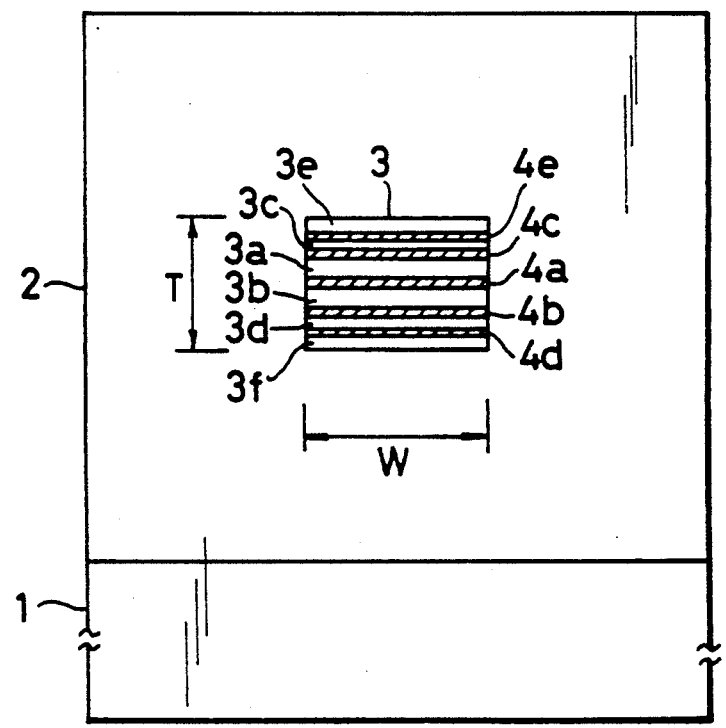

FIG. 6 shows an embodiment in which a further larger number of rare earth element-doped layers are provided. In this embodiment, five layers doped with a rare earth element are provided, spaced apart from each other along the direction of thickness T of the core waveguide 3. For T=8 μm, the thickness of the rare earth element-doped layers 4a to 4e are set to be 1.5 μm, 1 μm, 1 μm, 0.5 μm, and 0.5 μm, respectively. On the other hand, the thickness of the core layers 3a to 3f not doped with a rare earth element are set to be 0.75 μm, 0.75 μm, 0.5 μm, 0.5 μm, 0.5 μm, and 0.5 μm, respectively. That is, the thickness of the rare earth element-doped region is preferably not more than 30% based on the thickness of the core. Thus, the rare earth element-doped layers can be provided in from 2 to about ten and a few layers.

FIG. 7 shows a process for producing the rare earth element-doped layer optical waveguide of FIG. 5.

Figure 7A:
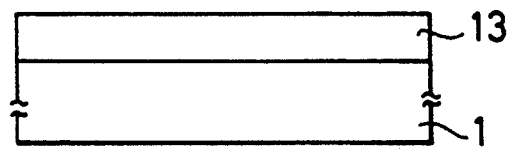
Figure 7B:
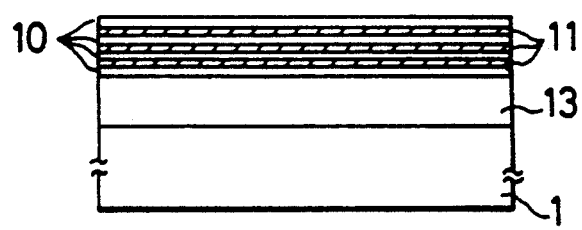
Figure 7C:
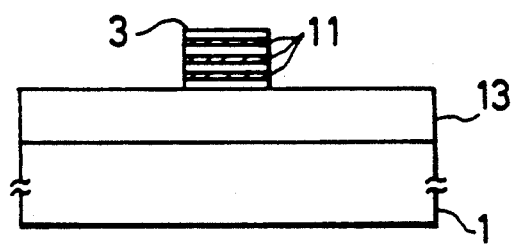
Figure 7D:
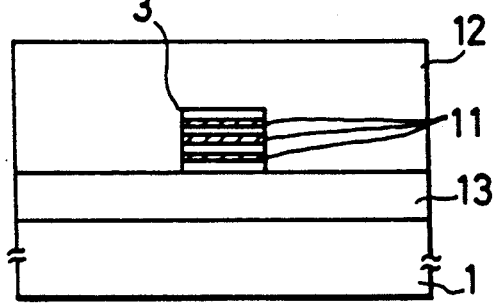

First, as shown in FIG. 7(a), a first clad layer 13 is provided on a substrate 1. The clad layer 13 may be provided by any one of the CVD method, the electron beam source evaporation method, the sputtering method, the flame deposition method and the like. Next, as shown in FIG. 7(b), core layers 10 not doped with a rare earth element and core layers 11 doped with a rare earth element are alternately laminated. The core layers 11 may be provided by any one of the CVD method, the electron beam source evaporation method, the sputtering method and the like. Subsequently, as shown in FIG. 7(c), photolithography and dry etching process are carried out to fabricate a multi-layer form core waveguide 3 on the first clad layer 13. In this case, the rare earth element-doped layers are capable of being etched easily because they are thin layers. An etching gas to be used here may be, for instance, $CHF_3$ or a mixture of $CHF_3$ with $CHCl_3$. Finally, as shown in FIG. 7(d), the core waveguide is covered by a second clad layer 15 having substantially the same refractive index as that of the first clad layer 13, whereby a buried-type optical waveguide is formed.

Since the rare earth element-doped layers are provided in a plurality of layers (two or more layers) in the core waveguide, the optical waveguide is capable of being used to construct an optical circuit, such as an optical directional coupling circuit, an optical wave demultiplexer, an ring resonator (cavity) circuit, an optical filter circuit and an optical switching circuit, which is less dependent on polarization.

Figure 8:
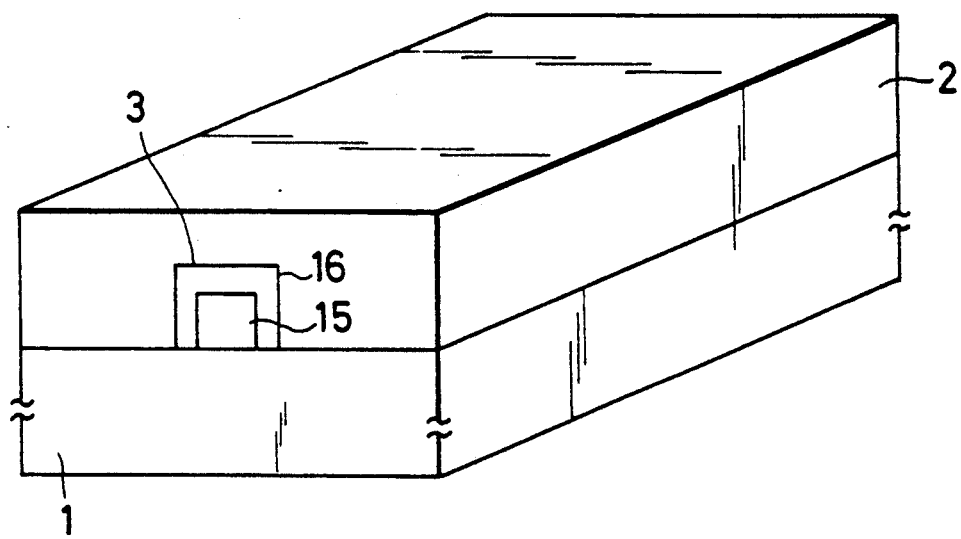

FIG. 8 shows an optical waveguide in which a core waveguide 3 comprising a first core waveguide 15 substantially rectangular in cross section and redoped uniformly with a rare earth element and a second core waveguide 16 so formed as to cover the first core waveguide 15 and not doped with a rare earth element is provided in a cladding 2. The optical waveguide is produced by a process illustrated in FIG. 9.

Figure 9A:
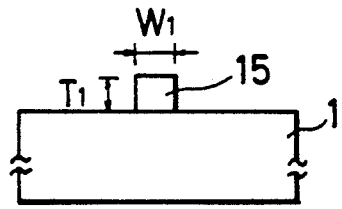

FIG. 9(a) shows a member obtained by forming a rare earth element-doped layer on a low-refractive-index substrate 1, followed by dry etching or the like to form a first core waveguide 15 substantially rectangular in cross section. As the substrate 1 here, a silica glass was used. When a multi-component glass, sapphire, Si or the like as the material for the substrate, it is necessary to provide a buffer layer of $SiO_2$ or of $SiO_2$ containing at least one refractive index controlling dopant, such as B, P, Ti, Ge, Ta, Al, F, etc., according to the refractive index of the core. The first core waveguide 15 contains at least one refractive index controlling dopant, such as B, P, Ti, Ge, Ta, Al, F, etc., and also contains at least one of Yb, Er and Nd as a rare earth element contributing to optical amplification.

Figure 9B:
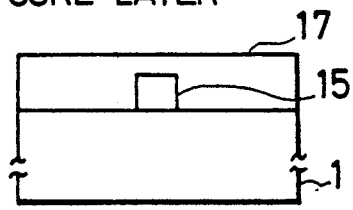
Figure 9C:
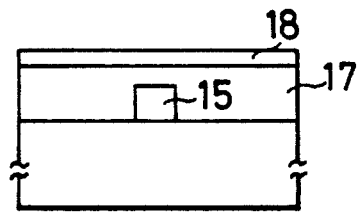
Figure 9D:
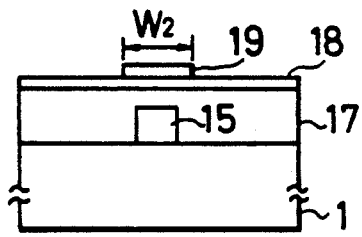
Figure 9E:
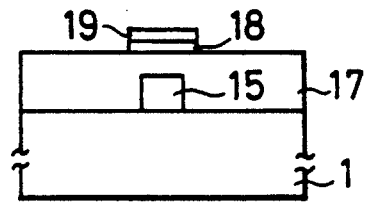
Figure 9F:
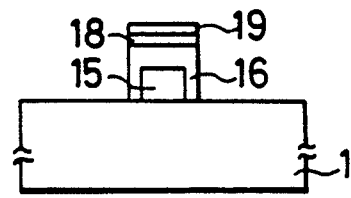
Figure 9G:
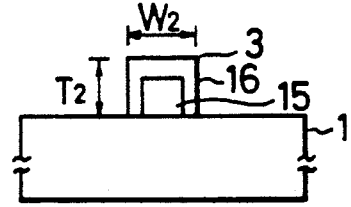
Figure 9H:
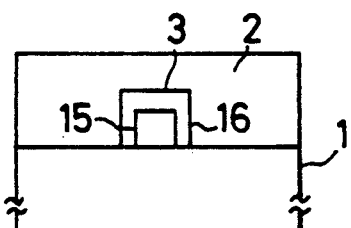
Figure 13A:
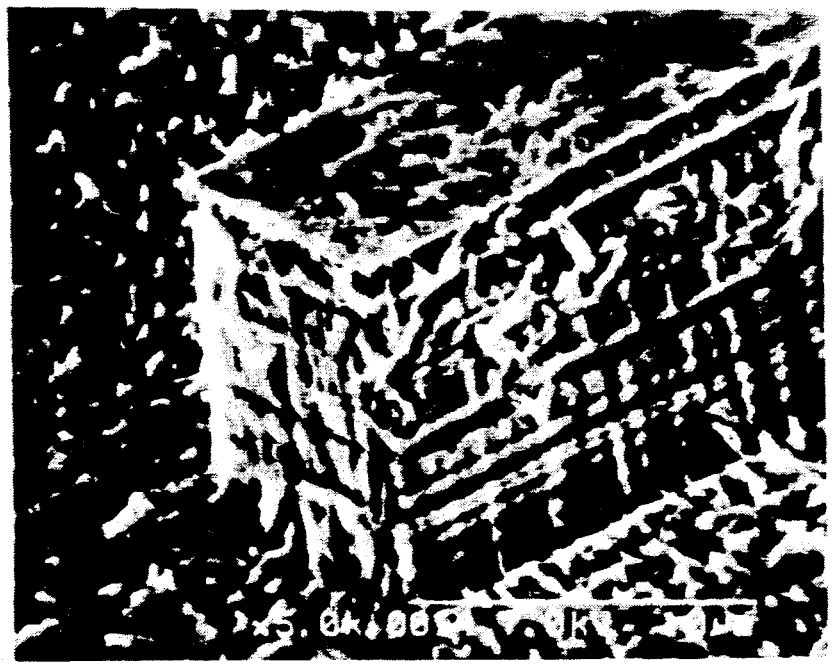
FIG. 13(a) is an SEM photograph of a rare earth element-doped core waveguide formed by a process according to the prior art.
Figure 13B:
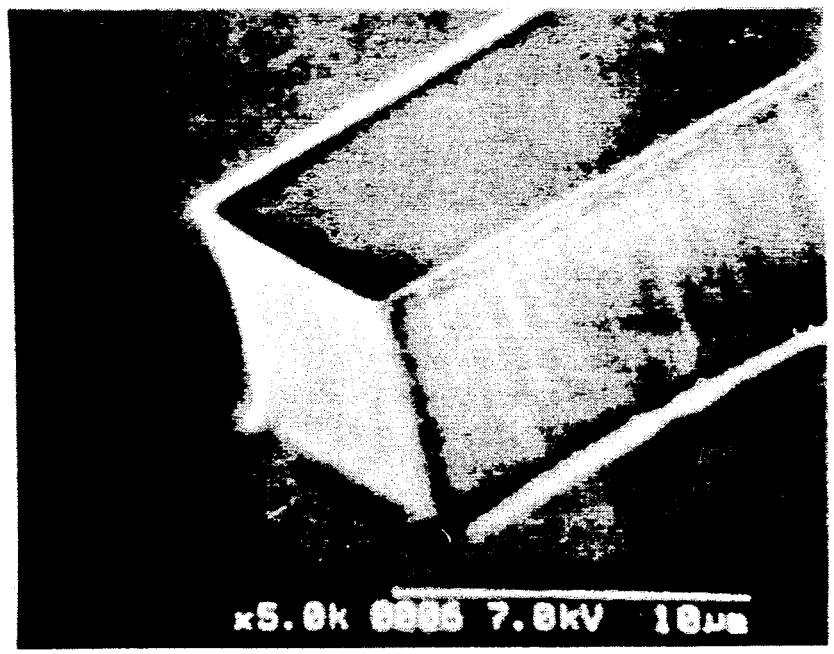
FIG. 13(b) is an SEM photograph of a core waveguide not doped with a rare earth element.

If the concentration of Er or Nd reaches or exceeds several hundreds of ppm at this stage, side faces of the first core waveguide 15 would show severe roughening upon etching [FIG. 13(a)]. To avoid such a problem, the width $W_1$ and the thickness $T_1$ of the first core waveguide 15 are preliminarily set slightly smaller than the final core waveguide dimensions, and is buried completely in a core layer 17 not doped with a rare earth element and having a refractive index equal to or slightly lower than the refractive index of the first core waveguide 15, as shown in FIG. 9(b). Next, as shown in FIG. 9(c), a metal film 18 about 1 μm thick is provided, for the subsequent etching of the core layer 17. Then, as shown in FIG. 9(d), a photoresist 19 is provided on the metal film 8 by photolithography. The pattern width $W_2$ of the photoresist 19 is set slightly (about 2 μm) greater than the width $W_1$ of the first core waveguide 15, to enable sufficient covering of the side faces of the first core waveguide 15. Subsequently, dry etching of the metal film 18, dry etching of the covering core layer 17, and removal of the photoresist 19 and the metal film 18 are carried out sequentially, to form on the low-refractive index substrate 1 a core waveguide 3 which comprises the first core waveguide 15 and the second core waveguide 16 not doped with a rare earth element and so formed as to cover the core waveguide 15. Finally, a clad layer 2 is formed so as to cover the entire surface of the core waveguide 3.

According to this process, the first core waveguide 15 doped with the rare earth element is provided and then the second core waveguide 16 not doped with a rare earth element is provided so as to cover the first core waveguide 15, and, therefore, it is possible to provide the core waveguide 3 with a smooth surface. Consequently, it is possible to prevent the scattering of propagating (transmitted) light at the surface of the core waveguide 3. In addition, since the refractive index of the first core waveguide 15 is equal to or higher than the refractive index of the second core waveguide 16, light is capable of being concentrated effectively on the interior of the first core waveguide 15, and the transmission efficiency of the core waveguide 3 can be enhanced.

FIG. 10 shows another embodiment of the process for producing a rare earth element-doped optical waveguide. In this embodiment, a first core waveguide 20 having a refractive index approximate to the refractive index of a core waveguide 3 and doped with a rare earth element is provided at a central portion of the core waveguide 3, in order to contrive enhancement of the performance of the optical waveguide in use as an optical amplification waveguide.

First, as shown in FIG. 10(a), a core layer 21 not containing a rare earth element and a rare earth element-doped core layer 22 having a refractive index approximate to the refractive index of the core layer 21 are provided in succession on a low-refractive index substrate 1. Next, by photolithography and dry etching as shown in FIGS. 10(b) to 10(f), the first core waveguide 20 is provided. Here, such a patterning is conducted that the width $W_1$ and thickness $T_1$ of the first core waveguide 20 satisfy the relations $W_1 = W_2/3$ and $T_1 = T_2/3$, where $W_2$ and $T_2$ are the final width and thickness of the core waveguide. Subsequently, as shown in FIG. 10(g), the first core waveguide 20 is buried in a core layer 31 having a refractive index equal to that of the core layer 21. The resulting body is again subjected to photolithography and dry etching, as shown in FIGS. 10(h) and 10(i), to form the core waveguide 3 having the width $W_2$ and the thickness $T_2$. Finally, a clad layer 2 is provided, as shown in FIG. 10(j).

Figure 11:
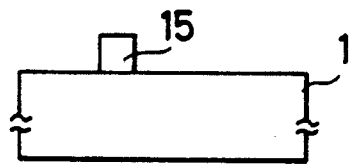
Figure 11B:
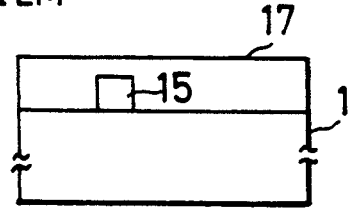
Figure 11C:
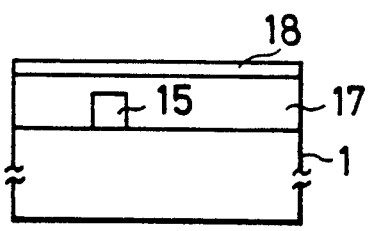
Figure 11D:
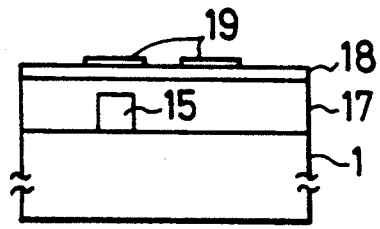
Figure 11:
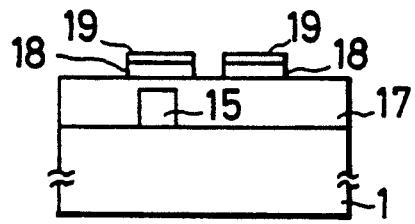
Figure 11F:
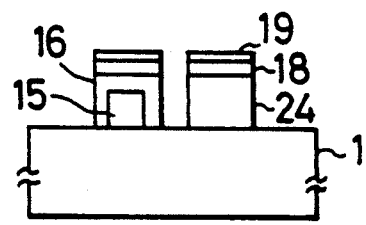
Figure 11G:
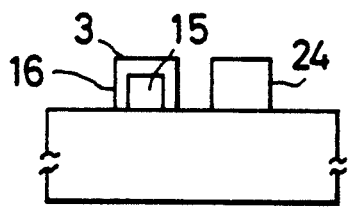
Figure 11H:
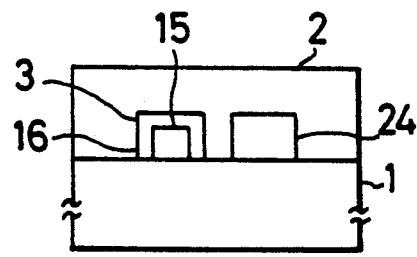
Figure 12:
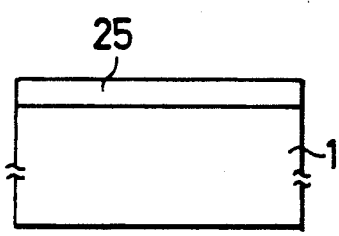
FIGS. 12(a)-(h) shows a set of schedule drawings illustrating an examplary process according to the prior art.
Figure 12:
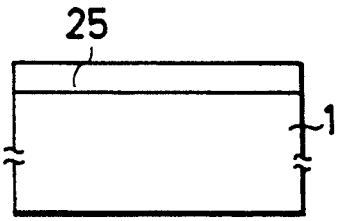
Figure 12:
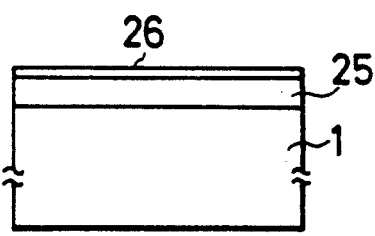
Figure 12:
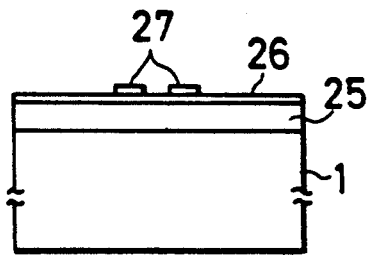
Figure 12:
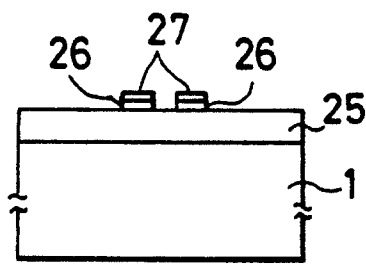
Figure 12:
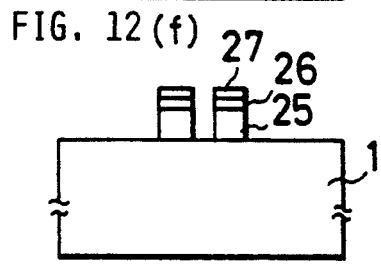
Figure 12G:
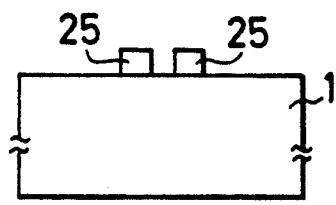
Figure 12H:
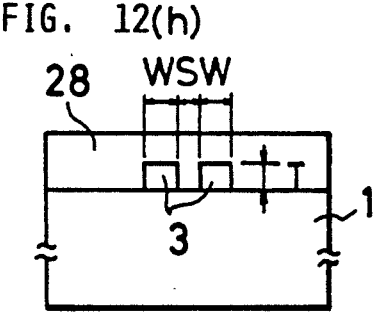

A process shown in FIG. 11 is forming a low-loss rare earth element-doped waveguide and a rare earth element-undoped waveguide, in a collective manner on the same substrate. The steps shown in FIGS. 11(a) to 11(c) are the same as those shown in FIGS. 9(a) to 9(c). In this process, however, in the next step of FIG. 11(d), a photoresist 19 is patterned also at a portion other than the portion directly above the first core waveguide 15, whereby the rare earth element-undoped core waveguide 24 can also be formed together. The steps shown in FIGS. 11(e) to 11(h) are the same as those shown in FIGS. 9(e) to 9(h). According to this process, for instance, an Er-doped optical waveguide to be used for a signal optical amplifier at a wavelength of 1.53 μm and an optical waveguide for excitation light at a wavelength of 1.46 to 1.48 μm are capable of being formed on the same substrate in one body.

We claim:

1. A rare earth element-doped optical waveguide comprising:
    a substrate;
    a cladding provided on the substrate;
    a core waveguide provided in the cladding, the core waveguide being substantially rectangular in cross section with the width thereof greater than the thickness thereof; and
    a rare earth element-doped layer provided in the core waveguide along a waveguiding direction, whereby good optical confinement is ensured in the width direction of the waveguide.

2. The optical waveguide of claim 1, wherein the rare earth element-doped layer is provided at a substantially central portion in the thickness direction of the core waveguide, and the rare earth element-doped layer has a uniform impurity doping concentration in the width direction thereof.

3. The optical waveguide of claim 1, wherein a plurality of the rare earth element-doped layers are provided and the layers are spaced from each other in the thickness direction of the core waveguide.

4. The optical waveguide of claim 3, wherein at least one of the rare earth element-doped layers has a thickness different from a thickness of another rare earth element-doped layer.

5. The optical waveguide of claim 4, wherein the volume occupied by the rare earth element-doped layers is not more than 30% of the entire volume of the core waveguide.

6. The optical waveguide of claim 4, wherein the refractive index of the rare earth element-doped layer is greater than the refractive index of that region of the core waveguide which is not doped with a rare earth element.

7. A rare earth element-doped optical waveguide comprising:
    a substrate;
    a cladding provided on the substrate; and
    a core waveguide provided in the cladding, the core waveguide being substantially rectangular in cross section, the core waveguide including a first core waveguide doped with a rare earth element and a second core waveguide not doped with a rare earth element, the first core waveguide being substantially rectangular in cross section, the second core waveguide covering the first core waveguide.

8. The optical waveguide of claim 7, wherein the first core waveguide is doped with the rare earth element in a layer pattern along a waveguiding direction.

9. The optical waveguide of claim 8, wherein the refractive index of the first core waveguide is equal to or greater than the refractive index of the second core waveguide.

10. A method of producing a rare earth element-doped optical waveguide comprising the steps of;
    providing a first cladding layer on a substrate;
    laminating on the first cladding layer alternately at least one core layer not doped with a rare earth element and at least another core layer doped with a rare earth element;
    forming on the first cladding layer a core waveguide having a rare earth element-doped layer and being substantially rectangular in cross section; and
    providing a second cladding layer so as to cover the entire surface of the core waveguide.

11. The method of producing a rare earth element-doped optical waveguide comprising the steps of:
    providing a first core waveguide doped with a rare earth element and substantially rectangular in cross section on a substrate having a low refractive index;
    providing a core layer not doped with a rare earth element over the substrate so as to bury completely the first core waveguide therein;

forming on the substrate a core waveguide including the first core waveguide and a rare earth element-undoped second core waveguide covering the first core waveguide; and providing a cladding layer so as to cover the entire surface of the core waveguide.

12. The method of claim 11, wherein a core layer formed of the same material as the second core waveguide is provided on the substrate, and the first core waveguide is provided on the thus formed core layer.

* * * * *